(12) United States Patent
Matsumoto et al.

(10) Patent No.: US 7,038,081 B2
(45) Date of Patent: May 2, 2006

(54) METHOD FOR PRODUCING POLYACRYLIC ACID

(75) Inventors: Yukihiro Matsumoto, Kobe (JP); Sei Nakahara, Himeji (JP); Kunihiko Ishizaki, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/375,140

(22) Filed: Feb. 28, 2003

(65) Prior Publication Data
US 2003/0181621 A1   Sep. 25, 2003

(30) Foreign Application Priority Data
Mar. 20, 2002   (JP) ............................. 2002-078678

(51) Int. Cl.
   *C07C 51/16* (2006.01)
(52) U.S. Cl. ....................... 562/545; 562/549
(58) Field of Classification Search ............... 562/512, 562/523, 542, 543, 545, 549, 548
   See application file for complete search history.

(56) References Cited

FOREIGN PATENT DOCUMENTS

| EP | 0 922 717 | 6/1999 |
|----|-----------|--------|
| GB | 2 095 688 | 10/1982 |
| JP | 52111986  | * 9/1977 |

OTHER PUBLICATIONS

Chemical Abstracts, vol. 88, No. 14, Apr. 3, 1978, Columbus, Ohio, U.S.; abstract No. 90451, "Continuous Polymerization of Sodium Acrylate", p. 29, col. 1; XP002253377 & JP 77 111986 A (Sumitomo Chem., Co. Ltd.), Sep. 20, 1977.

* cited by examiner

*Primary Examiner*—Johann Richter
*Assistant Examiner*—Karl Puttlitz
(74) *Attorney, Agent, or Firm*—Wenderoth, Lind & Ponack, L.L.P.

(57) ABSTRACT

A method for producing polyacrylic acid includes a combined process of an acrylic acid production process and a polyacrylic acid production process. The acrylic acid production process includes the steps of catalytically oxidizing propylene and/or propane in a gaseous phase to generate reaction product, absorbing the reaction product in a solvent, and purifying acrylic acid from an acrylic acid aqueous solution containing the solvent by purification. The polyacrylic acid production process includes the step of utilizing heat medium recovered in the acrylic acid production process to purify polyacrylic acid from the acrylic acid aqueous solution or from acrylic acid.

8 Claims, 2 Drawing Sheets

FIG.1

METHOD FOR PRODUCING POLYACRYLIC ACID

BACKGROUND OF THE INVENTION

1. Field of the Invention

This invention relates to a method for producing polyacrylic acid by utilizing steam and chilled liquid generated in an acrylic acid production process, and to an apparatus for implementing the same method.

2. Description of the Prior Art

Acrylic acid is a raw material for various chemical products. Particularly, there has been reported that desired polyacrylic acid such as water-absorbent resin is producible in a polyacrylic acid production plant built in the same site or in vicinity of an acrylic acid production plant, by using high-purity acrylic acid produced in the acrylic acid production plant as a raw material.

Acrylic acid is produced by various methods. For instance, one method is known in which propylene and/or propane is fed to an evaporator for gasification, and the gasified propylene and/or propane is fed to a gas-phase catalytic oxidation device where the gasified propylene and/or propane is contacted with a gas in the presence of a catalyst to yield reaction product containing acrylic acid and byproduct. Then, the reaction product and a absorbing solvent are fed to a absorbing device to yield acrylic acid aqueous solution containing the byproduct, which is then drawn to a distillation/purification device including azeotropic distillation column, heavy-ends cut column, and rectification column for distillation and purification in this order sequentially, thereby producing acrylic acid of high purity. Further, the thus obtained high-purity acrylic acid is fed to a polyacrylic acid production plant built at the same site or in vicinity of the acrylic acid production plant to produce desired polyacrylic acid such as water-absorbent resin.

Particularly, in producing high-purity acrylic acid of large quantity with inexpensive cost on an industrial scale, efforts have been made to reduce production cost by recycling various substances discharged from certain processes for reuse in other processes, in addition to regulating the operating conditions in the respective production processes. For instance, Japanese Unexamined Patent Publication No. 2001-131109 discloses a method of recycling heat medium used in gasifying liquefied propylene in an evaporator. In this publication, heat medium is transformed into liquid chilled coolant by utilizing latent heat generated by gasification of liquefied propylene or the like. In this technology, latent heat, which has been wasted conventionally, is utilized by using a heat exchanger such as cooler and condenser used in an acrylic acid production process so as to save energy for cooling.

In an acrylic acid production process, steam is obtained by recovering heat of reaction generated in a gas-phase catalytic oxidation device. However, in addition to the above-mentioned steam obtainable from the heat of reaction, steam is obtainable by various ways. For example, steam is recovered from a cooling step of cooling reaction product generated in a gas-phase catalytic oxidation device, or from a recovering step of recovering heat of combustion generated at the time of burning waste gas or waste liquid discharged from an acrylic acid production process.

Reuse of the steams recovered from the above different steps has been practiced in the conventional acrylic acid production process. However, the reuse has been insufficient. For instance, in the case where steam recovered by a heat recovering device such as a boiler for recovering heat of reaction generated in a gas-phase catalytic oxidation device is high-pressure steam having a pressure of not lower than 1.0 MPa gauge (the temperature is not specifically limited, but normally is not lower than 183° C. and lower than 270° C.), acrylic acid in the production process may be overheated if such high-pressure steam is used as heat medium for a heating device such as a reboiler which is attached to an acrylic acid distillation device, with the result that polymerized substance may be generated. Hereinafter, the gauge pressure is simply indicated as "G". In view of such a drawback, high-pressure steam is required to be depressurized before use. Further, in the case where steam is medium-pressure steam of not lower than 0.6 MPaG and lower than 1.0 MPaG (temperature: e.g. not lower than 164° C. and lower than 183° C.), such medium-pressure steam is usable as heat medium for heating in an azeotropic distillation column or a high-boiling-component-removing column without depressurizing the steam. However, it is likely that polymerized substance may generate in a column at a final stage of producing high-purity acrylic acid even with supply of such medium-pressure steam. Accordingly, it is also necessary to depressurize medium-pressure steam for use at such a final stage of high-purity acrylic acid production, and the number of locations where medium-pressure steam is usable is limited. In view of the above, it is desirable to feed low-pressure steam as heat medium into a reboiler which is attached to a column for producing acrylic acid as final product, wherein the low-pressure steam is not lower than 0.2 MPaG and lower than 0.6 MPaG (temperature: e.g. not lower than 133° C. and lower than 164° C.). It is needless to say that these low-pressure steam, medium-pressure steam, and high-pressure steam are used as heat medium for a heat exchanger other than heating a distillation column, as well as for a power source for driving a turbine. However, consumption quantity of steam in an acrylic acid production process relative to the total quantity of steam derived by recovering heat of reaction and heat of combustion in the acrylic acid production process decreases, particularly, as the pressure of the steam to be supplied increases. This means that the higher the pressure is, the less the number of locations where the steam is usable as heat medium is. Consequently, the consumption quantity of steam is lowered compared to the generated quantity of steam, with the result that a large quantity of the steam is discharged outside of the reaction system without reuse. Particularly, since high-pressure steam is required to be depressurized before use, high-pressure steam is seldom reused and most of the high-pressure steam is discharged outside of the reaction system.

Japanese Unexamined Patent Publication No. 2001-131109 discloses a recycling technique of latent heat (liquid chilled coolant) as to how to reuse latent heat recovered by gasification of liquefied propylene in an evaporator. However, an integrated recycling system has not been developed so far, wherein a polyacrylic acid production process for producing polyacrylic acid by feeding acrylic acid produced in an acrylic acid production process to the polyacrylic acid production process, and the acrylic acid production process are integrated.

In view of the above, an object of this invention is to provide a method for efficiently utilizing steam obtained by recovering heat source such as heat of reaction generated in an acrylic acid production process, in a combined process of an acrylic acid production process and a polyacrylic acid production process for producing polyacrylic acid by using acrylic acid produced in the acrylic acid production process, and a method for efficiently utilizing latent heat recovered by gasification of propylene and the like.

Another object of this invention is to provide an apparatus capable of implementing the above method.

SUMMARY OF THE INVENTION

An inventive method that has accomplished the above object is a method for producing polyacrylic acid comprising an acrylic acid production process and a polyacrylic acid production process. The acrylic acid production process includes the steps of catalytically oxidizing propylene and/or propane in a gaseous phase to generate reaction product, absorbing the reaction product in a solvent, and purifying acrylic acid from an acrylic acid aqueous solution containing the solvent by purification. The polyacrylic acid production process includes the step of introducing heat recovered in the acrylic acid production process into the polyacrylic acid production process to purify polyacrylic acid from the acrylic acid aqueous solution or from acrylic acid.

According to another aspect of this invention, provided is an apparatus of producing polyacrylic acid comprising: an evaporator for gasifying propylene and/or propane; a device for catalytically oxidizing the gasified propylene and/or propane in a gaseous phase; a device for absorbing reaction product generated in the gas-phase catalytic oxidation device in a solvent; a device for purifying acrylic acid from an acrylic acid aqueous solution containing the solvent generated in the absorbing device by distillation; a device for neutralizing the acrylic acid aqueous solution and the acrylic acid before (in this case, neutralization by monomer) or during or after polymerization (in both cases, neutralization by gel); a device for polymerizing the acrylic acid; and a device for drying the polymerized substance. In the apparatus, a pipeline is provided to feed heat medium obtained in a heat recovering device into an acrylic acid production apparatus.

DETAILED DESCRIPTION OF THE PREFERRED EMBODIMENTS OF THE INVENTION

A feature of this invention resides in that an acrylic acid production process and a polyacrylic acid production process are implemented integrally. The acrylic acid production process includes the steps of catalytically oxidizing propylene and/or propane in a gaseous phase to generate reaction product, absorbing the reaction product in a solvent, and purifying acrylic acid from an acrylic acid aqueous solution containing the solvent by purification. The polyacrylic acid production process includes the step of introducing heat recovered in the acrylic acid production process into the polyacrylic acid production process to purify polyacrylic acid from the acrylic acid aqueous solution or from acrylic acid. Further, another feature of this invention resides in that all or part of latent heat which is recovered at the time of evaporating propylene and/or propane is fed to the polyacrylic acid production process.

In this invention, polyacrylic acid is (co)polymer containing acrylic acid and/or its salt as a primary ingredient of monomer (preferably 70 mol % or larger, more preferably, 90 mol % or larger, and most preferably substantially 100 mol %). Specifically, examples of polyacrylic acid include water-soluble polyacrylic acid (salt), water-absorbent resin (namely, water-absorbent polyacrylic acid (salt)). Preferred examples of polyacrylic acid salt include monovalent salt. More preferred examples of polyacrylic acid include alkali metal salt and ammonium salt. These polyacrylic acids may be co-polymerized with other monomers, or may be cross-linked by a cross-linking agent of 0.001 to 5 mol % (value corresponding to acrylic acid), or may be graft-polymerized with other hydrophilic polymer such as starch and polyvinyl alcohol. Water-soluble polymer is polymer that is soluble in water with substantially 100% solubility. Water-absorbent resin is water-swelling, water-insoluble polyacrylic acid having cross-linking structure, and is a material capable of absorbing de-ionized water or saline three times, preferably ten to one-hundred times as large as its weight, and capable of producing water-insoluble hydro gel containing water-soluble component (water-soluble content) of 25 mass % or less, preferably 10 mass % or less. Examples of such water-absorbent resin and measuring methods of physical and chemical properties thereof are disclosed in U.S. Pat. No. 6,107,358, U.S. Pat. No. 6,174,978 and U.S. Pat. No. 6,241,928.

Figure 1:
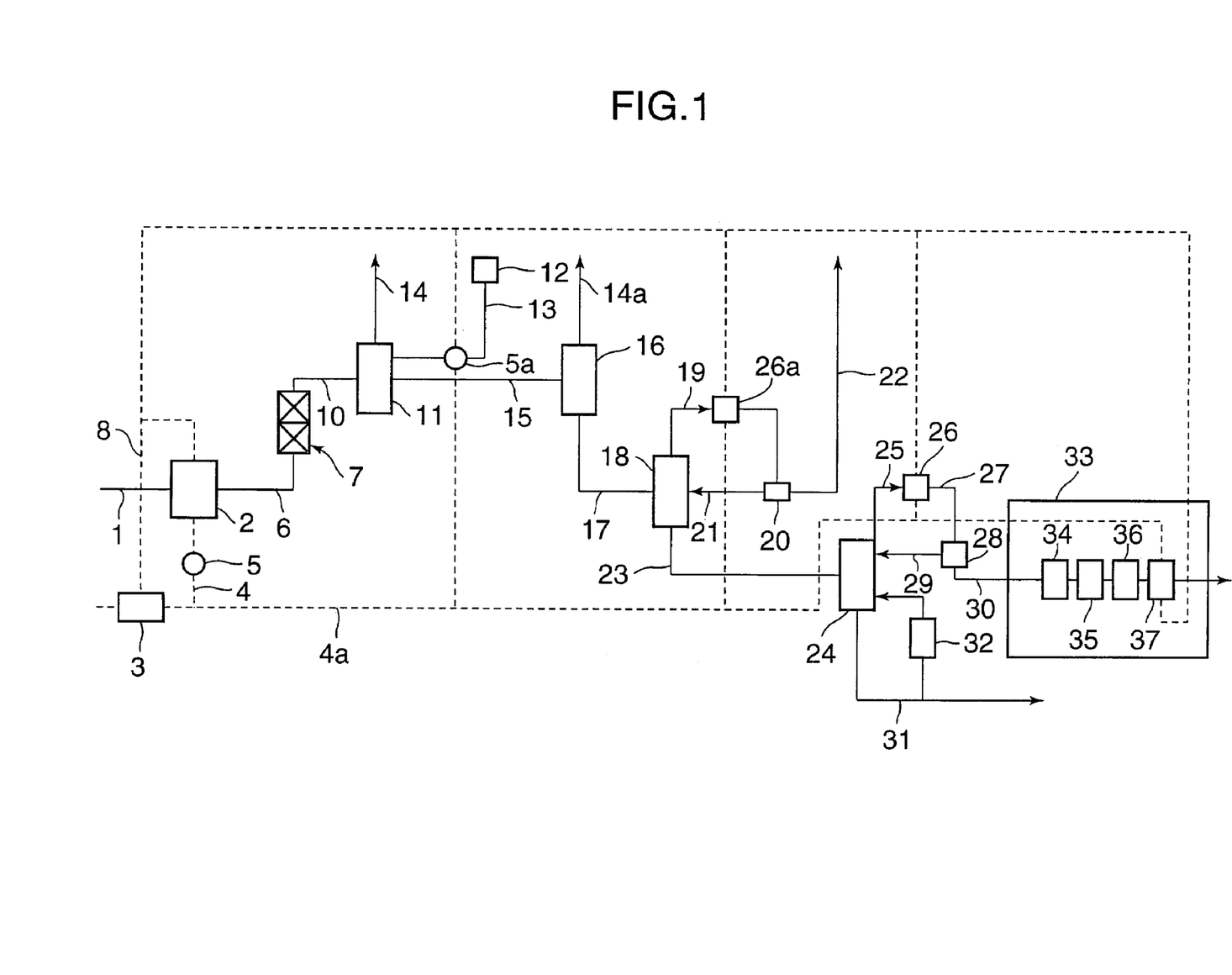
FIG. 1 is a schematic drawing showing an acrylic acid production process in accordance with an embodiment of this invention, and an example of a flow of utilizing latent heat in this invention.

Hereinafter, an embodiment of the inventive method is described with reference to FIG. 1. FIG. 1 illustrates an acrylic acid production process using propylene and/or propane (hereinafter, simply called as "propylene") as a raw material, and a polyacrylic acid production process (in this embodiment, water-absorbent resin production process is exemplified as such a process) using acrylic acid produced in the acrylic acid production process. This invention is not restricted to the below-mentioned production process, and may be optionally altered or changed as far as such change and alteration do not obstruct the effects of this invention. In view of this, steam to be generated and latent heat to be recovered in the acrylic acid production process are not restricted to the below-mentioned kinds, and steam and latent heat other than the illustrated ones may be appropriately processed according to the inventive method.

Referring to FIG. 1, liquefied propylene is fed to an evaporator 2, which is an evaporating device for gasifying liquefied propylene, via a pipeline 1. Liquid heat medium for gasifying liquefied propylene is fed from a reservoir 3 to the evaporator 2 via a pipeline 4 and a heat exchanger 5 (temperature regulator). In the evaporator 2, liquefied propylene is gasified by heat exchange with liquid heat medium. Accordingly, the temperature of liquefied propylene for gasification is required to be lower than the temperature of liquid heat medium. If, however, the temperature of the liquefied propylene is too low, a running pressure for evaporating the liquefied propylene is required to be low accordingly, with the result that the specific volume of gasified propylene to liquefied propylene is extremely large. Then, the volume of the chamber of the evaporator is required to be large in order to retain the evaporating velocity in the evaporator in an appropriate range, which resultantly increases the size of the evaporator. In order to avoid increase of the dimensions of the evaporator, it is preferable to set the temperature of the liquid heat medium to be fed to the evaporator 2 at 0° C. or higher, more preferably 5° C. or higher.

The temperature of the liquefied propylene for gasification becomes sufficiently high by raising the temperature of the liquid heat medium to be fed to the evaporator 2. Then, the specific volume of gasified propylene to liquefied propylene becomes sufficiently small, and the aforementioned drawback can be overcome. However, excessively high temperature in the evaporator 2 may raise the inner pressure of the evaporator beyond the inner pressure of a reservoir (not shown) for feeding liquefied propylene, which may necessitate a high-pressure feeding pump to feed the liquefied propylene with its inner pressure properly regulated, into the evaporator 2.

More specifically, in the case where the temperature of both of liquid heat medium and liquefied propylene to be fed to the evaporator 2 is high, a high-pressure pump is required to feed liquefied propylene into the evaporator 2. Then, it is required to construct the evaporator 2, the pipeline 1, and peripheral devices in association therewith such that these devices can withstand a certain pressure. This may raise feeding-related cost and facility cost. In view of this, it is preferable to set the temperature of the liquid heat medium at 50° C. or lower, more preferably 40° C. or lower, and furthermore preferably 35° C. or lower. Further, it is preferable to set the lower limit of the temperature of the liquid propylene for gasification at −30° C. or higher, more preferably −20° C. or higher, and to set the upper limit thereof at 30° C. or lower, more preferably 20° C. or lower.

It is desirable to keep the temperature of the liquid heat medium to be fed to the evaporator 2 in a predetermined range to secure stable generation of the evaporated amount from the evaporator 2. It is preferable to provide a temperature regulator such as a heat exchanger 5 to allow liquid heat medium of a desired temperature to be fed to the evaporator 2. It is needless to say that a temperature regulator (not shown) may be provided at the reservoir 3 to regulate the temperature of the liquid heat medium fed therefrom.

The method of regulating the temperature of the liquid heat medium is not specifically limited. For instance, heat medium to be introduced into the heat exchanger 5 for the temperature regulation may be low-pressure steam (pressure: not lower than 0.2 MPaG and lower than 0.6 MPaG, temperature: not lower than 133° C. and lower than 164° C.), or medium-pressure steam (pressure: not lower than 0.6 MPaG and lower than 1.0 MPaG, temperature: not lower than 164° C. and lower than 183° C.). The temperature of the liquid heat medium may be regulated by, for example, adjusting the quantity of heat medium in such a manner as to keep the temperature of the liquid heat medium in a predetermined range. It is desirable to utilize steam obtained from a below-described heat recovering device as heat medium in the heat exchanger to reduce cost relating to temperature regulation. Further, in case of lowering the temperature of liquid heat medium, it is desirable to introduce a below-mentioned liquid chilled coolant into the heat exchanger for temperature regulation.

The heat exchanger used in this embodiment may be a known device. Examples of the known heat exchanger include shell-and-tube type heat exchanger, plate heat exchanger, and spiral heat exchanger all of which are used in raising temperature, and absorption type cooling device which is used in cooling.

As far as heat medium is in the form of liquid, it is usable as liquid heat medium. It is, however, recommendable to use a liquid which is at least free from solidification by latent heat generated at the time of heat exchange with liquefied propylene, as such liquid heat medium. Examples of liquid heat medium include water such as industrial water and tap water, brine such aqueous ethylene glycol solution and aqueous methanol solution. In this embodiment, brine whose solidification temperature is lower than water is used as the liquid heat medium. However, liquid heat medium is selected optionally according to the operating conditions of the acrylic acid production process.

The inner pressure of the evaporator 2 is not specifically limited. However, if the pressure is too low, sufficient evaporating efficiency may not be obtained. In view of this, it is preferable to set the lower limit of the inner pressure of the evaporator 2 at 0.1 MPaG or higher, more preferably 0.2 MPaG or higher, and further more preferably 0.3 MPaG or higher. On the other hand, if the pressure is too high, it is required to construct the evaporator, feeding pipe, etc. such that these devices can withstand a certain pressure. In view of this, it is preferable to set the upper limit of the inner pressure of the evaporator 2 at 2.0 MPaG or lower, more preferably 1.5 MPaG or lower, and further more preferably 1.0 MPaG or lower.

Although not illustrated, a pressure control valve, fluid rate control valve, or liquid feeding pump may be provided at an appropriate position on pipelines 1 and 4, and other pipelines according to needs to optimally regulate the inner pressure of the evaporator.

Latent heat is generated by gasification of liquefied propylene in the evaporator 2, and is recovered by cooling liquid heat medium. (Hereinafter, chilled liquid heat medium is called as "liquid chilled coolant"). The liquid chilled coolant is drawn out of the evaporator 2 and is fed back to the reservoir 3 via a line 8.

The temperature of the liquid chilled coolant immediately after having been drawn out of the evaporator 2 differs depending on the temperature of liquefied propylene to be fed to the evaporator, processing performance of the evaporator, feeding amount of liquefied propylene and liquid heat medium, etc. Accordingly, the temperature of the liquid chilled coolant is not specifically limited. However, for example, assuming that liquid heat medium in the aforementioned temperature range is fed to the evaporator, and the temperature of the liquid chilled coolant drawn out of the evaporator is lower than −10° C. In such a case, the heat transfer coefficient is lowered because of raised viscosity of the liquid chilled coolant. This means that heat exchanging efficiency is low. In view of the above, it is desirable to regulate the operating conditions of the acrylic acid production process such as feeding amount of liquid heat medium, temperature of liquid heat medium to be fed to the evaporator, and liquid propylene to be drawn out of the evaporator in such a manner that the lower limit of the temperature of the liquid chilled coolant is set at −10° C. or higher, more preferably −5° C. or higher, and further more preferably 0° C. or higher. On the other hand, if the temperature of the liquid chilled coolant after heat exchange is too high, it is required to further lower the temperature of the liquid chilled coolant by using a cooling device such as a refrigerator in order to utilize the liquid chilled coolant as a refrigerant in a below-described condenser or a heat exchanger. This is not desirable because the cost required for temperature regulation of the liquid chilled coolant is raised. In view of this, it is recommendable to regulate the operating conditions in such a manner that the upper limit of the temperature of the liquid chilled coolant after heat exchange is set at 40° C. or lower, more preferably 35° C. or lower, and further more preferably 30° C. or lower.

If the total quantity of the liquid chilled coolant is left in the acrylic acid production process without being discharged outside of the reaction system, namely, without being fed to the polyacrylic acid production process, it is required to increase the size of the reservoir 3 in order to keep the liquid chilled coolant therein. This is because it is impossible or difficult for the condenser, cooler, and the like provided in the acrylic acid production process to completely consume the total quantity of the liquid chilled coolant. Further, if the total quantity of the liquid chilled coolant is left in the acrylic acid production process, quantity of heat necessary for raising the temperature of the liquid chilled coolant in the heat exchanger 5 increases. This may hinder efficient use of steam obtained by heat recovery. In view of this, it is desirable to feed all or part of the liquid chilled coolant to a device of polyacrylic acid production process, especially such as a cooling device 37, by way of pipeline 4a or a pipeline not shown in the Figure. In view of this, the liquid chilled coolant may be fed back to the reservoir 3 from the evaporator 2 via the pipeline 8, and then fed to the cooling device 37 via a pipeline 4a, as illustrated in FIG. 1, or may be directly fed to the cooling device 37 without being fed back to the reservoir 3. Further alternatively, a certain number of pipelines may be provided to use the liquid chilled coolant as a refrigerant in a desired device such as various heat exchangers, cooler, and condenser in the acrylic acid production process.

Alternatively, the liquid chilled coolant may be fed to other device(s) after regulating the temperature thereof by a temperature regulator (not shown) provided at an appropriate position on the pipeline according to needs. Further alternatively, temperature change may be suppressed by covering the pipeline with a heat insulating member. As a further altered arrangement, a liquid feeding pump, fluid rate control valve, and pressure control valve may be optionally arranged to regulate the feeding amount of the liquid chilled coolant. In the case where liquid chilled coolant is fed to the heat exchanger, condenser, and the like as a refrigerant, heat exchanging operation such as cooling and condensation can be carried out in a stable manner through temperature regulation, for example, by providing a temperature regulator at such a location as to feed the liquid chilled coolant in a desired temperature range.

Gasified propylene is fed from the evaporator 2 via a pipeline 6 to a reactor 7, which is a gas-phase catalytic oxidation device. When the gasified propylene is fed to the reactor 7, the gasified propylene is contacted with molecular oxygen which is introduced into the reactor 7 by another pipeline (not shown) for gas-phase catalytic oxidation reaction. Examples of molecular oxygen include air, oxygen-rich air, and pure oxygen. The type of the gas-phase catalytic oxidation device is not specifically limited. However, it is recommendable to use a shell-and-tube type reactor because it has excellent heat exchangeability.

The operating conditions of the reactor 7 are not specifically limited. For instance, in case of implementing two-stage gas-phase catalytic oxidation reaction in the reactor 7, acrolein-containing gas is generated from the gasified propylene in the first-stage catalyst layer. At this time, it is recommendable to set the reaction temperature of the reactor in the range of 250 to 450° C. reaction pressure in the range of 0 to 0.5 MPaG, and space velocity in the range of 300 to 5,000 $h^{-1}$ (STP) to obtain high reaction efficiency. Acrolein-containing gas generated in the first-stage catalyst layer is introduced to the second-stage catalyst layer to produce acrylic-acid-containing gas in the second-stage catalyst layer. Regarding the second-stage catalyst layer, it is preferable to set the lower limit of the reaction temperature at 100° C. or higher, more preferably 150° C. or higher, the upper limit of the reaction temperature at 380° C. or lower, more preferably 300° C. or lower, reaction pressure in the range of 0 to 0.5 MPaG, and space velocity in the range of 300 to 5,000 $h^{-1}$ (STP) in order to obtain high reaction efficiency. Catalyst to be loaded in the first- and second-stage catalyst layers in the reactor may be an oxidation catalyst which is generally used in producing acrylic acid. It is needless to say that a known method for producing acrylic-acid-containing gas using a single-stage or multiple-stage catalyst layer may be applicable, in addition to the two-stage gas-phase catalytic oxidation method, as a method for producing acrylic-acid-containing gas.

As mentioned above, heat of reaction is generated by gas-phase catalytic oxidation of gasified propylene. The heat of reaction can be removed by contacting the heat indirectly with a medium. For instance, when gasified propylene is fed to the first-stage catalyst layer loaded in the tube of the reactor 7, heat of reaction is generated in the first-stage catalyst layer by gas-phase catalytic oxidation. The heat of reaction in the tube is removed by feeding high-temperature heat medium such as 50 mass % of potassium nitrate or 50 mass % of sodium nitrite at a certain reaction temperature (e.g. in the range of 250 to 450° C.) to the shell part of the reactor 7. Thus, part of the heat medium with the heat of reaction being recovered is taken out and is recovered as steam by a heat recovering device (heat removing boiler), whereby the heat medium is cooled to a predetermined temperature. The heat medium is then fed to the shell part of the reactor so as to regulate the reaction temperature in the reactor in a predetermined range. The above removal of heat of reaction is also carried out with respect to the second-stage catalyst layer similar to the first-stage catalyst layer by feeding a high-temperature heat medium at a predetermined reaction temperature into the reactor.

In some cases, a heat recovering device is provided each for the first-stage reactor and the second-stage reactor to allow the heat recovering device for the first-stage reactor to generate high-pressure steam and the heat recovering device for the second-stage reactor to generate medium-pressure steam. In other cases, a single heat recovering device which is commonly used for the first-stage reactor and the second-stage reactor is provided to generate high-pressure steam or medium-pressure steam.

According to the embodiment of this invention, a heat recovering device for recovering heat of reaction or heat of combustion is not specifically limited. A known heat recovering device such as cylindrical boiler, natural circulation tubular boiler, controlled circulation boiler, through-flow boiler may be used as examples of the heat recovering device in this invention. It is recommendable to feed all or part of high-pressure steam of not lower than 1.0 MPaG which is obtained by recovering heat of reaction to a drying device of the polyacrylic acid production process via a pipeline.

For example, if the temperature of the heat of reaction obtained in the first-stage catalyst layer is higher than that of the heat of reaction obtained in the second-stage catalyst layer, steam obtained by recovering the heat of reaction in the first-stage catalyst layer has high pressure than steam obtained by recovering the heat of reaction in the second-stage catalyst layer. Accordingly, it is desirable to feed the steam derived from the first-stage catalyst layer into the drying device in the polyacrylic acid production process by a pipeline. Particularly, high-pressure steam derived from the first-stage catalyst layer of 2.0 MPaG or higher, preferably 3.0 MPaG or higher is suitable as heat medium in the drying device to carry out efficient drying.

It should be appreciated that polymerized substance may likely to be generated when such high-pressure steam is fed as heat medium into the heat exchanger and re-heater in the distillation/purification device of the acrylic acid production process, which is not desirable. It is, however, possible to utilize such high-pressure steam as heat medium by depressurizing the high-pressure steam to medium- or low-pressure steam through pressure regulation and by feeding the medium- or low-pressure steam into the heat exchanger and re-heater in the acrylic acid production process.

Heat of reaction generated in the second-stage catalyst layer in the reactor 7 is removed in the similar manner as the first-stage catalyst layer, by feeding the heat of reaction into the heat recovering device such as a boiler and by generating saturated steam therein. The pressure of steam generated in the heat recovering device differs depending on the operating conditions of the heat recovering device. Although it is preferable to use steam derived from the first-stage catalyst layer in order to dry water-absorbent resin efficiently as mentioned above, in the case where the steam generated in the heat recovering device is high-pressure steam in the range of 1.0 MPaG to about 4.0 MPaG, this high-pressure steam derived from the second-stage catalyst layer may be fed as heat medium to the drying step for drying water-absorbent resin. In such a case, it is preferable to provide at least one pressure regulator for pressure regulation of the high-pressure steam. Specifically, it is preferable to provide a pressure regulator to keep the pressure for generating saturated steam in the heat recovering device in a predetermined range. Further, it is preferable to provide a pressure regulator at an appropriate position on the pipeline for feeding steam to the water-absorbent resin production apparatus to keep the steam pressure to be fed to the water-absorbent resin production apparatus in a predetermined range. In the case where generated quantity of high-pressure steam exceeds the quantity of high-pressure steam to be consumed in the water-absorbent resin production apparatus, it is preferable to provide a pressure regulator at an appropriate position on the steam feeding pipeline and to feed the steam to the acrylic acid distillation/purification device via the pressure regulator in such a manner that the steam pressure in the steam feeding pipeline is kept in a predetermined range. Further, it may be preferable to absorb blow-down water in a heat recovering device of recovering heat generated from high-pressure steam to generate medium- or low-pressure steam and to feed the medium- or low-pressure steam to the acrylic acid distillation/purification device or to the water-absorbent resin production apparatus. Generally, since the quantity of steam derived from the first-stage catalyst layer is sufficient to provide a certain quantity of heat necessary for drying water-absorbent resin and the like, use of high-pressure steam derived from the second-stage catalyst layer is not necessary. In view of the above, it is preferable to generate medium-pressure steam in the second-stage catalyst layer and to utilize such medium-pressure steam as heat medium in the acrylic acid production process. Also, it is desirable to depressurize high-pressure steam to medium- or low-pressure steam, to use the medium- or low-pressure steam in heating/heat-insulating means provided in the distillation column, and to provide a pressure regulator at an appropriate position on the steam feeding pipeline to regulate the steam pressure inside the pipeline in a predetermined range for discharging excessive steam out of the reaction system.

As mentioned above, according to this embodiment, all or part of steam obtained by recovering heat of reaction generated at the time of gas-phase catalytic oxidation is utilized in the heating step of the polyacrylic acid production process. Examples of the heating step to be applied in this invention include a step in which heating is necessary such as polymerizing step, drying step, and surface cross-linking step. Particularly, a preferred heating step is a drying step, because the content of residual monomer in water-absorbent resin can be reduced by drying the water-absorbent resin with use of steam in the drying step.

Acrylic-acid-containing gas, which is reaction product generated in the reactor 7 is fed via a line 10 to a absorbing column 11, which is a absorbing device for purifying acrylic acid from the acrylic-acid-containing gas with a solvent. In the case where the temperature of acrylic-acid-containing gas to be fed to the absorbing column 11 is too high, it is highly likely that acrylic-acid-containing solution in the absorbing column may be easily polymerized, which may resultantly lower the yield of acrylic acid. In view of this, it is recommendable to cool the acrylic-acid-containing gas to a temperature of 200° C. or lower prior to being fed to the absorbing column 11. Accordingly, it is preferable to provide a cooling device and/or a heat recovering device in vicinity of an outlet port of drawing reaction product out of the reactor 7 or at an appropriate position on the pipeline 10. Particularly, it is desirable to attach a heat recovering device such as a boiler to the absorbing column 11 for cooling the reaction production in the reactor 7, as well as for heat recovery.

In the case where the temperature of the reaction product at the outlet of the reactor 7 is in the range of 150 to 380° C., for example, the reaction product may be fed to a boiler for heat recovery. In the case where steam obtained by the heat recovery is medium-pressure steam of not lower than 0.6 MPaG and lower than 1.0 MPaG, such medium-pressure steam can be optimally used as heat medium in a distillation column, reboiler, heater, heat exchanger etc., installed in a final distillation/purification stage, except a purification column 24. Further, in the case where steam obtained by the heat recovery is low-pressure steam of not lower than 0.2 MPaG and lower than 0.6 MPaG, such low-pressure steam may be used as heat medium in the purification column 24, namely, heat medium in the reboiler, heater, heat exchanger which are attached to the purification column 24 without likelihood of generation of polymerized substance. It is needless to say that medium- or high-pressure steam may be usable as heat medium by depressurization.

A absorbing solvent is fed from a absorbing solvent cooler 12 to the absorbing column 11 via a pipeline 13 to generate acrylic-acid-containing solution by gas-liquid contact of acrylic-acid-containing gas with the absorbing solvent. The acrylic-acid-containing solution is fed to a next step via a pipeline 15 whereas residual substance in the absorbing column 11 is discharged out of the reaction system as waste gas. The waste gas contains un-absorbed reaction gas. The waste gas may be fed back to the reactor 7 via a pipeline (not shown) for gas-phase catalytic oxidation, or may be supplied to a combustion step (not shown). The method of processing waste gas is not specifically limited. For instance, the temperature of combustion gas obtained by burning waste gas is generally high. Accordingly, heat of combustion derived from burning waste gas may be fed to a heat recovering device such as a boiler to generate steam. The generated steam is usable as heat medium in a heat exchanger depending on the steam pressure.

In this embodiment, the combustion equipment used in burning waste gas or waste liquid, which will be described later, is not specifically limited. However, it is recommendable to use known combustion equipment such as vertical combustion furnace and transverse combustion furnace in case of gas-phase combustion or liquid combustion. A combustion method is also not limited. In case of burning waste gas, for example, a gas combustion method employing a catalyst or a gas-liquid combustion method employing a fuel may be used.

Conventionally known absorbing solvents may be used as a solvent to be fed to the absorbing column 11. Examples of the absorbing solvent include low-boiling solvent (having boiling point lower than acrylic acid) such as water and organic-acid-containing water, and inert hydrophobic organic solvent of high-boiling point (boiling point higher than acrylic acid) (such as diphenylether and diphenyl). In the case where water is used as a solvent, acrylic acid contained in the acrylic acid containing gas is purifyed by contacting water with acrylic acid containing gas in the absorbing column. Thus, an acrylic acid aqueous solution (e.g. the content of acrylic acid: 50 to 80 mass % with the remaining part thereof consisting of water and impurities) is obtained.

If acrylic acid containing gas is contacted with a high-boiling solvent such as a combined solvent of, e.g. diphenylether and biphenyl, part of the acrylic acid containing gas is absorbed in the high-boiling solvent, thereby producing an acrylic acid solution. The operating temperature of the absorbing column 11, etc. is not specifically limited. However, it is desirable to regulate the temperature at the top of the absorbing column 11 in the range of 40 to 70° C. for efficient purifyion.

In absorbing acrylic acid, use of a solvent of a lower temperature is preferable to gain high absorbing yield. Further, it is desirable to regulate the temperature of the solvent to be fed to the absorbing column within a predetermined range to continue the absorbing operation stably. It is desirable to control the temperature of the solvent such that the lower limit of the solvent is 0° C. or higher, more preferably 5° C. or higher, and the upper limit of the solvent is 35° C. or lower, more preferably 30° C. or lower. Cost required for keeping the temperature of the solvent at such a low level, namely, for cooling the solvent is suppressed by introducing liquid chilled coolant as heat medium into a heat exchanger 5a by the pipeline 4a. In raising the temperature of the liquid chilled coolant, cost required for heating the liquid chilled coolant is suppressed by introducing low- or medium-pressure steam recovered by a boiler or the like as heat medium into the heat exchanger 5a.

Acrylic-acid solution (preferably acrylic acid aqueous solution) obtained in the absorbing column is fed to the next step via the pipeline 15. The acrylic acid solution may contain, in addition to acrylic acid, un-reacted product such as propylene which remains in un-reacted state, byproduct such as formaldehyde, acrolein, furfural, benzaldehyde, formic acid, acetic acid, maleic acid, acrylic acid dimer, and additive such as polymerization inhibitor.

Acrylic acid solution may be directly fed to an azeotropic separation column 18 by the pipeline 15, or may be indirectly fed thereto by way of an arbitrary step according to needs. For example, acrylic acid solution may be fed to a stripping column 16 prior to being fed to the azeotropic separation column to reduce the content of acrolein in the acrylic acid solution. After removing acrolein in the stripping column 16, the acrylic-acid containing solution is introduced to the purification/separation column (azeotropic separation column) 18 by a pipeline 17. Alternatively, acrolein may be removed in the stripping column 16 and discharged out of the reaction system via a pipeline 14a as waste gas, or may be removed outside of the reaction system by a pipeline 14 after passing through the absorbing column 11.

The waste gas may be subjected to an arbitrary process, or may be fed to an unillustrated combustion step, similar to the manner of processing waste gas drawn out of the reaction system by the pipeline 14, in such a manner that heat of combustion generated in the combustion step is recovered as steam and is utilized as heat medium in the acrylic-acid production process.

In the azeotropic distillation column 18, azeotropic distillation is carried out with use of an azeotropic solvent (at least one kind of azeotropic solvent) to remove low-boiling substance such as water and an azeotropic solvent from the acrylic acid aqueous solution. In this embodiment, dehydration distillation is performed with use of an azeotropic solvent which is azeotropic with water. The running condition of the azeotropic distillation column 18 is not specifically limited. As far as a known acrylic-acid production process is executable under a certain running condition, the running condition is not limited. Alternatively, a known distillation method may be used, in place of azeotropic distillation, to separate and remove target impurities from an acrylic acid aqueous solution. The distillation method, distillation condition, number of times of distillation, and distillation device may be arbitrarily combined according to the purpose of distillation.

A known solvent may be used as an azeotropic solvent. It is preferred to use an azeotropic solvent having property such that the solvent is not azeotropic with acrylic acid. An azeotropic solvent which is hardly soluble in water is preferred because such an azeotropic solvent is easily separable from distilled aqueous phase and thus easily recovered and reusable. Examples of such an azeotropic solvent include toluene, xylene, hexane, heptane, cyclohexane, methylisobutylketone, and butyl acetate. One or more kinds of azeotropic mixture may be used as an azeotropic solvent. It is desirable to use a certain amount of azeotropic solvent capable of exhibiting sufficient separating effect in order to improve efficiency of azeotropic distillation.

Byproduct having low-boiling point than acrylic acid, and light-boiling substance such as water is distilled off through the top of the distillation column 18 along with the azeotropic solvent as distilled fraction gas (hereinafter, called as "distilled gas") via a pipeline 19. High-boiling impurities such as maleic acid and acrylic acid dimer, and acrylic acid and polymerization inhibitor are drawn out of the bottom of the distillation column 18 as crude acrylic acid, and is fed to a next step via a pipeline 23.

The distilled gas is fed to a condenser 26a by the pipeline 19 for condensation and cooling. Thus, the distilled gas is turned into distilled liquid, which is fed to azeotropic solvent separating means 20 such as decanter. In the azeotropic solvent separating means, the distillated liquid is separated into oil phase (azeotropic solvent) and aqueous phase (absorbing liquid). The azeotropic solvent after the separation is fed back to the azeotropic distillation column 18 for re-circulation by a pipeline 21 in this embodiment. Alternatively, the azeotropic solvent may be introduced into another step (not shown). A specific example of the re-circulation is not illustrated in the drawings of this specification. Likewise, the aqueous phase may be fed to another processing step. For instance, in case of processing waste water by combustion, it is preferable that heat of combustion generated by the combustion process is introduced into a heat recovering device such as a boiler to recover the heat of combustion as steam and that the steam is utilized as heat medium for various devices in the acrylic-acid production process.

It is preferable to feed liquid chilled coolant from the reservoir 3 to the condenser 26a by the pipeline 4a and to use the liquid chilled coolant as a refrigerant. Use of the liquid chilled coolant serves to suppress the cost required for cooling by a refrigerant. Similar to the case of the heat exchanger 5a, it is desirable to regulate the temperature of the liquid chilled coolant to be fed to a condenser 26 in a predetermined range in order to maintain stable operation of the condenser and to improve condensing efficiency.

Crude acrylic acid produced by the azeotropic distillation is introduced to the distillation/purification device such as the purification column 24 via a pipeline 23. Before the crude acrylic acid is fed to the purification column 24, another distillation step may be provided to further reduce the content of the impurities in the crude acrylic acid. For instance, an acrylic acid containing solution may be fed to an arbitrary distillation/purification column such as a light-ends cut column (not shown) and a heavy-ends cut column (not shown) to reduce the content of the impurities in the acrylic acid containing solution. In other words, acrylic acid distillation/purification devices usable in a normal acrylic acid production process may be combined according to the purpose, condition of distillation, etc. It is preferred to feed a temperature-regulated liquid chilled coolant as a refrigerant to a desired device such as cooler, condenser, and heat exchanger, if heating or cooling operation such as condensation, refrigeration or heating is necessary in such a distillation column. Also, it is preferable to feed steam obtained by heat recovery as heat medium into a desired device such as heater, reboiler, and heat exchanger after regulating the temperature and pressure of the steam according to needs.

In this embodiment, an acrylic acid solution is a liquid obtained by absorbing acrylic acid containing gas in a absorbing column, or a liquid with the content of acrolein being reduced by passing the absorbing liquid through a stripping column after the absorbing column. Crude acrylic acid is a liquid which contains acrylic acid as a main ingredient and is obtained by distilling the acrylic acid solution. Crude acrylic acid contains byproducts such as acetic acid, formaldehyde, acrolein, propionic acid, maleic acid, acetone, furfural, benzaldehyde, and impurities. These byproducts and impurities are removed by purification of the crude acrylic acid (such as distillation and crystallization). Thus, acrylic acid substantially free of aldehyde (content of aldehyde of not larger than 0.001 mass %, preferably not larger than 0.0005 mass %) is produced. Such acrylic acid substantially free of aldehyde is called as high-purity acrylic acid in this invention.

In the purification column 24, distillation (purification) is carried out to purify crude acrylic acid so as to obtain high-purity acrylic acid. Thus, high-purity acrylic acid is obtained by distillation. In the illustrated example of FIG. 1, acrylic acid contained in crude acrylic acid is turned into vapor by distillation when it is fed to the purification column 24. The thus generated vapor is distilled off through the top of the purification column 24 and is introduced to a condenser 26 by a pipeline 25. In the condenser 26, the steam is turned into a condensate. The condensate in the condenser 26 may be fed to a reflux reservoir 28 by a pipeline 27 for storage. Part of the condensate in the reflux reservoir 28 may be fed back to the purification column 24 as reflux liquid. The condenser 26 is attached to the purification column 24 to condense and cool the substance distilled off through the top of the purification column 24. In performing heat-exchange with steam of acrylic acid in the condenser, it is preferable to regulate the temperature of a refrigerant to be introduced into the condenser in a predetermined range to perform stable condensation. In such a case, it is preferable to feed a liquid chilled coolant to the condenser 26 by the line 4a. In lowering the temperature of the liquid chilled coolant, a cooling device (not shown) may be provided to perform temperature regulation of the liquid chilled coolant. In raising the temperature of the liquid chilled coolant, the liquid chilled coolant may be introduced into the heat exchanger shown in FIG. 1, while introducing low- or medium-pressure steam generated from a boiler as heat medium into the heat exchanger for temperature regulation.

The condensate produced in the condenser 26 is high-purity acrylic acid (purified acrylic acid) substantially free of impurities. The purity of high-purity acrylic acid varies depending on the purification condition. However, generally, acrylic acid having purity of 99.5 mass % or more is obtained.

The condensate in the reflux reservoir 28 is fed as a raw material to the polyacrylic acid production process (in FIG. 1, corresponding to a water-absorbent resin production process 33) by a pipeline 30. High-purity acrylic acid may be fed to another step for a desired process prior to being fed to the polyacrylic acid production process.

High-boiling impurities and polymerization inhibitor contained in the crude acrylic acid is accumulated at the bottom of the purification column 24 after separating the crude acrylic acid into acrylic acid, and the impurities and the polymerization inhibitor by distillation. The thus accumulated high-boiling impurities and polymerization inhibitor are discharged as waste liquid. The waste liquid may be fed to another step for a desired processing. For instance, the waste liquid may be fed to a combustion step by the pipeline 31, and heat of combustion generated by the combustion is introduced into a heat recovering device such as a boiler and recovered as saturated steam. The recovered saturated steam may be fed to a desired device as heat medium. It is needless to say that in this embodiment, waste heat which is generated by combustion of various waste liquid (waste water and waste oil) and/or waste gas and is discharged out of the acrylic acid production process may be recovered by any heat recovering method so that the recovered heat may be utilized as heat medium.

According to this embodiment, any device capable of heat exchanging such as cooler and condenser, in addition to the illustrated ones, may be used. In this embodiment, it is desirable to utilize liquid chilled coolant (latent heat) which is recovered in the evaporator 2 as a refrigerant in such un-illustrated cooler and condenser.

In this embodiment, a part of the bottom liquid containing polymerization inhibitor and impurities may be fed back to a reboiler 32, and another part of the bottom liquid may be drawn out of the purification column 24 by the line 31 and fed to a waste liquid processing step, or may be fed to another processing step. It should be appreciated that heating/heat-insulating devices such as unillustrated reboiler, heat-insulating jacket for distillation column, pre-heater for pre-heating raw material to be fed, and heat exchanger are equipped with respect to various distillation columns such as azeotropic distillation column, light-boiling-component separating column, acetic-acid separating column, high-boiling-component separating column, and purification column, as well as the purification column 24. It is desirable to feed steam obtained by recovering heat in the acrylic acid production process as heat medium into the heating/heat-insulating means equipped with respect to these distillation columns to reduce the cost required for heating.

Although not illustrated, it is desirable to add polymerization inhibitor of a certain amount necessary for preventing polymerization to a feed liquid to be fed to various distillation steps and/or into a distillation column according to needs. The manner of adding polymerization inhibitor is not limited. For instance, the polymerization inhibitor may be added to a liquid such as crude acrylic acid and reflux liquid before the liquid is introduced into the distillation column, and the mixture may be added into the distillation column. Alternatively, the polymerization inhibitor may be directly fed to the distillation column (in this case, the polymerization inhibitor may be in any form of powder, liquid, or gas). For instance, in the case where molecular oxygen is fed into the distillation column as polymerization inhibitor, molecular oxygen may be directly fed into the bottom of the distillation column by air bubbling or the like, or may be indirectly fed after dissolving the polymerization inhibitor in another solvent.

The kind of the polymerization inhibitor is not specifically limited as far as the polymerization inhibitor has an effect of preventing polymerization of acrylic acid. Examples of polymerization inhibitor include hydroquinone, hydroquinone monomethylether, phenothiazine, 4-hydroxy-2,2,6,6,-tetramethylpiperidine, nitrosophenol, copper salt compound such as copper dimethylthiocarbamate, and manganese compound such as manganese acetate. Polymerization inhibitor may be a mixture in which one or more kinds are mixed together. The composition of the polymerization inhibitor may be determined desirably according to the purpose of use.

Part or all of acrylic acid solution or acrylic acid (preferably high-purity acrylic acid) is fed to the water-absorbent resin production process 33 (in this embodiment, the water-absorbent resin is water-insoluble hydrophilic resin which is turned into gel by absorbing water) by the pipeline 30. In the water-absorbent resin production process, water-absorbent resin is produced by performing a specified process, namely, by introducing the acrylic acid produced in the acrylic acid production process into a neutralization step 34 (an optional step), polymerization step 35, drying step 36, and cooling step 37 one after another in this order. It is needless to say that a desired step may be provided among these steps to improve various chemical and physical properties of the water-absorbent resin. For instance, a cross-linking step may be provided during or after polymerization.

Neutralization step is an optional step which is provided according to needs. As an example of neutralization step, proposed is a method for mixing a predetermined amount of powder of basic substance, aqueous solution, and acrylic acid with polyacrylic acid (salt) produced in the polyacrylic acid production process. However, the neutralization method is not specifically limited, and a known method may be applied. The neutralization step may be carried out before polymerization (in this case, neutralization with monomer), or during or after polymerization (in both cases, neutralization with gel), or may be carried out before and after polymerization. In the example of FIG. 1, polymerization step follows neutralization step. In the case where neutralization step follows polymerization step, the arrangement of the neutralization device (polymerization device) may be altered depending on the order of implementing these steps. Further, the polymerization device and the neutralization device may be identical to each other or different from each other.

Examples of basic substance used in neutralizing acrylic acid include known basic substances such as carbonate (hydrogen salt), hydroxide of alkali metal, ammonium, and organic amine. The neutralization ratio of acrylic acid is not specifically limited. The neutralizing agent may be added in such a quantity as to attain a specified neutralization ratio (e.g. in the range of 30 to 100 mol %, preferably in the range of 50 to 80 mol %). In the case where it is necessary to remove heat of reaction generated at the time of neutralization, reaction product after the neutralization may be introduced into cooling means, e.g. a cooling device such as a cooling tower. At this time, it is desirable to feed liquid chilled coolant as a refrigerant to the cooling device by the line 4a to suppress the cost required for cooling.

After the neutralization, acrylic acid salt solution is introduced to the polymerization step according to needs. The method of polymerization in the polymerization step is not specifically limited. A known polymerization method such as polymerization with use of radial polymerization initiator, polymerization with radioactive ray, polymerization with use of electron beam, and UV-ray polymerization with use of photosensitizer may be applicable. In the polymerization step, it is preferable to neutralize acrylic acid according to needs in such a manner that acrylic acid (salt) aqueous solution has the concentration of acrylic acid of not smaller than 10 mass %, more preferably of not smaller than 20 mass %, and not larger than 80 mass %, more preferably not larger than 70 mass %.

According to this embodiment, various requirements such as the kind of polymerization initiator and polymerization condition are arbitrarily selected. It is needless to say that a known additive such as cross-linking agent and other monomer, as well as water-soluble chain transfer agent and hydrophilic polymer may be added according to needs. Further, the kind of vessel and device used in the polymerization step is not limited, and a generally available polymerization device is usable as such a device.

Generally, polymer of acrylic acid salt obtained after polymerization (hereinafter, also called as "water-absorbent resin") is hydrous gel polymer. The hydrous gel polymer is fed to a drying step in order to remove moisture component therefrom. The drying method is not specifically limited. A known drying device such as hot air dryer, fluid bed dryer, drum dryer, Nautor dryer may be used to dry the gel polymer in a specified temperature range (preferably from 70 to 230° C.). It is recommendable to use steam discharged out of the acrylic acid production process, particularly high-pressure steam generated by recovering heat of reaction in the heat recovering device attached to the gas-phase catalytic oxidation device as heat medium and to feed such steam into the drying step 36.

Hydro gel (hydrous polymer) of polyacrylic acid is heat-dried with use of various dryers in the drying step. For instance, a heat-conductive, heat-transferable type dryer such as drum dryer and paddle dryer may be used. Drying may be performed by heating a heat transfer surface of such a dryer through supply of steam and by contacting hydro gel with the heat transfer surface of the dryer. It is desirable to perform hot-air, heat-transferable drying in which hydro gel is directly contacted with steam to reduce the content of residual monomer in the hydro gel and to improve drying efficiency. More specifically, it is preferable to dry hydro gel by hot air, wherein the hot air is gas containing steam (the lower limit of dew point is not lower than 50° C., preferably not lower than 60° C., the upper limit of dew point is not higher than 90° C., preferably not higher than 80° C.), and has a temperature of not lower than 100° C., preferably not lower than 150° C., and not higher than 200° C., preferably not higher than 180° C. to reduce the content of residual monomer and to improve water absorbing power of the water-absorbent resin. The drying period is normally in the range of 1 minute to 3 hours (preferably, 5 minutes to 1 hour).

After the drying step, the water-absorbent resin is discharged out of the reaction system in a high-temperature state. Accordingly, it is desirable to cool the water-absorbent resin to a certain temperature range (e.g. in the range of room temperature to 90° C., preferably in the range of 40 to 80° C.). The method of cooling water-absorbent resin is not limited. For instance, cool air may be blown onto the water-absorbent resin, or the water-absorbent resin may be introduced into a cooling device such as a refrigerator. Feeding the liquid chilled coolant to the cooling device by the line 4a as a refrigerant is desirable to suppress the cost required for cooling.

The water-absorbent resin thus cooled to the predetermined temperature range may be used as it is, or may be pelletized or crushed into a desired shape. Alternatively, various additives such as reducing agent, fragrant, or binder may be optionally added according to the purpose of use.

It is preferable to cool polyacrylic acid after drying in this embodiment. For instance, in the case where hydro gel is granulated into the size of about one to several millimeters by drying, polyacrylic acid after drying exists in dried particles of about one to several millimeters. Although the state of the dried particles differs depending on the drying method, the dried particles are generally in the form of coagulant. Accordingly, it is preferable to crush and classify the dried particles into powder of polyacrylic acid of a certain size (e.g. weight average particle diameter in the range of 10 to 1,000 μm, preferably in the range of 100 to 800 μm) according to needs. Further, it is preferable to add various reformers (e.g., aqueous solution of surface crosslinking agent, pelletized binder, and deodorant) according to needs. Adding the reformers in the cooling step is effective because it improves crushing efficiency and makes the peak of the particle size distribution sharp. Further, the reformers are uniformly distributed in the polyacrylic acid powder in the cooling step. Thus, variation in terms of various chemical and physical properties (e.g. water absorbing power under pressure) of the water-absorbent resin is suppressed with respect to the size of the particles of the powder.

Steam fed to the drying step 36 is discharged out of the drying step 36 after latent heat of the steam is utilized for heating in the drying step. The steam may be discharged out of the reaction system. However, as far as the steam retains a relatively high temperature and a relatively high pressure despite the fact that the temperature and the pressure of the steam is lowered than those before being introduced into the drying step, such steam may be fed back to the acrylic acid production process as heat source by performing appropriate pressure and temperature regulation. Particularly, it is desirable to generate steam by regulating the pressure of part of the drain discharged out of the drying step 36 and to collect the remaining drain for reuse in feeding water to a boiler. Steam generated in the drain recovering device may be fed to the distillation/purification device, or may be reused as heat source in the acrylic acid production process depending on the pressure and temperature of the steam.

According to this embodiment, it is preferable to use steam obtained by recovering heat of reaction generated in the acrylic acid production process and in the polyacrylic acid production process as heat medium in a desired device depending on the temperature and pressure of the steam. Alternatively, the temperature and pressure of the steam may be lowered to use the steam as heat medium in a desired device according to needs. Means for lowering the pressure and temperature of the steam is not specifically limited. Any regulating means is applicable. Further, it is desirable to discharge unnecessary steam out of the reaction system when need arises to do so in order to keep the pressure in the reaction system in a well-balanced manner.

Figure 2:
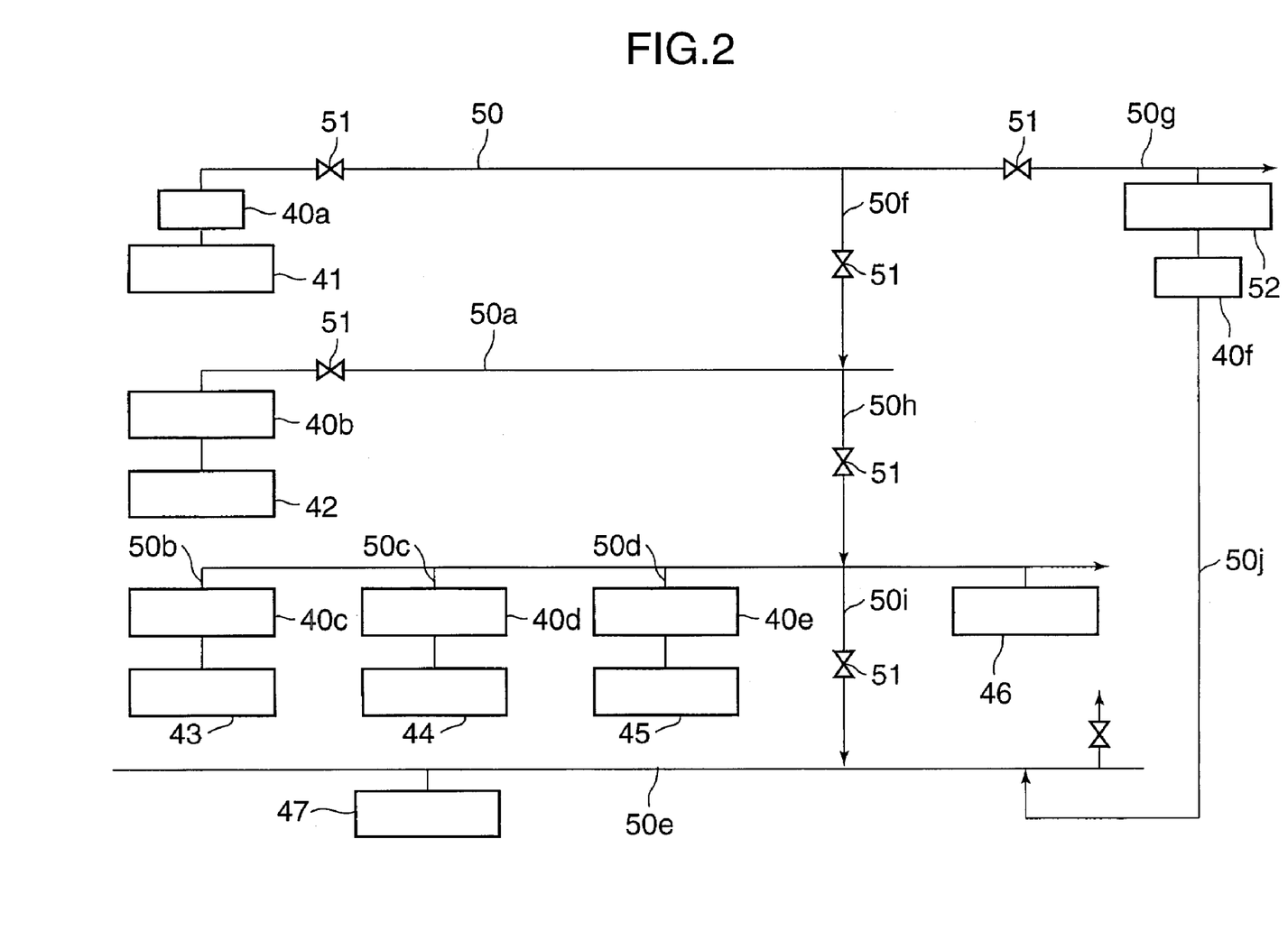
FIG. 2 is a schematic drawing showing an example of a flow of utilizing steam in this invention.

As mentioned above, a typical acrylic acid production process and polyacrylic acid production process that follows the acrylic acid production process according to an embodiment of this invention are described with reference to FIG. 1. Hereinafter, an apparatus of implementing the acrylic acid production process and the polyacrylic acid production process continuously in association with each other is described with reference to FIG. 2. FIG. 2 schematically illustrates a flow of steam in the acrylic acid production process and the polyacrylic acid production process.

As mentioned above, the reactor is a gas-phase catalytic oxidation device for catalytically oxidizing gasified propylene and/or propane obtained by gasifying propylene and/or propane in an evaporator. Attached to the reactor is a heat recovering device such as a boiler. The heat recovering device generates steam by transferring heat of reaction onto heat medium such as water which is fed into the heat recovering device. In the embodiment of this invention, a two-stage gas-phase catalytic oxidation device is exemplified as such a reactor. Specifically, the reactor has heat recovering units 40a, 40b respectively provided on a first-stage catalyst layer 41 and a second-stage catalyst layer 42 to recover heat of reaction generated in the respective catalyst layers 41, 42. In this embodiment, the pressure of steam obtained by recovering heat of reaction in the first-stage catalyst layer is regulated by a pressure control valve 51 in such a manner that the pressure generated in the heat recovering unit 40a lies in a predetermined range. The steam is fed as heat medium to a desired device of the polyacrylic acid production apparatus via a pipeline 50. The polyacrylic acid production apparatus incorporates a neutralization device for neutralizing acrylic acid (preferably, purified acrylic acid), a polymerization device for polymerizing the neutralized substance, a drying device for drying the polymerized substance, and a cooling device for cooling the dried polyacrylic acid. In the case where the polyacrylic acid production process is a water-absorbent resin production process, it is desirable to feed the steam into the drying device for drying the polymerized substance after neutralization and polymerization of purified acrylic acid. In the drying device, the temperature of gas such as air may be raised to a desired temperature by heat exchanging with the steam as heat medium, and the hot gas may be blown onto the polymerized substance to deprive the polymerized substance of moisture component. Thus, the polymerized substance is dried.

In this embodiment, part of the steam generated in the first-stage catalyst layer is fed to a drying device 52 by a pipeline 50g, and part of the steam is fed to a desired device in the acrylic acid production process by a pipeline 50f. It is preferable to provide depressurizing means 51 at an appropriate position on the pipeline 50f to depressurize steam to a desired level. In case that the steam feeding amount from the first-stage catalyst layer is excessive, redundant part of the steam may be discharged out of the reaction system through an appropriate position on the pipeline.

In FIG. 2, merely the steam derived from the first-stage catalyst layer is fed to the polyacrylic acid production process, and steam derived from the second-stage catalyst layer is fed to a specified device in the acrylic acid production process by pipelines 50a, 50h. Alternatively, steam derived in the second-stage catalyst layer may be fed to the polyacrylic acid production process. Particularly, as far as steam is high-pressure steam of 1.0 MPaG or higher, such steam may be fed from the first-stage catalyst layer and/or the second-stage catalyst layer depending on the recovered quantity of steam, quantity of heat required in the polyacrylic acid production process, etc.

In the case where a heat recovering device 40c is attached to the reactor 7 to cool reaction product generated in the reactor 7, it is desirable to utilize steam obtained by recovering heat of the reaction product as heat medium in a specified device. In the case where steam obtained by recovering heat of the reaction product is medium-pressure (not lower than 0.6 MPaG and lower than 1.0 MPaG), part or all of the steam may be fed as heat medium by the pipeline 50b without depressurization, as illustrated in FIG. 2, or may be depressurized to a desired level, and then the heat medium may be fed to an arbitrary heater or heat exchanger such as a heater for heating and vaporizing bottoms in a reboiler attached to a distillation/purification device 46 or the like, heat exchanger for pre-heating feeding liquid, and heat exchanger for regulating the temperature of a refrigerant to be fed to a condenser or the like.

Further, steam is derived by recovering heat of combustion by a heat recovering device 40d, 40e, wherein the heat of combustion is generated by burning waste gas discharged from the acrylic acid production process such as waste gas discharged from the absorbing device for absorbing the reaction product in a solvent by a combustion device 44, or by burning waste liquid discharged from the acrylic acid production process such as waste liquid discharged from the distillation/purification device for purifying acrylic acid from an acrylic acid aqueous solution by a combustion device 45. Such steams may be utilized as heat medium in a desired device. Also, in the case where these steams are medium-pressure steam, the steams may be directly fed as heat medium into a desired device as mentioned above.

It should be noted that an acrylic acid production tower 47 for producing high-purity acrylic acid as a final product is a device which may most likely generate polymerized substance, among a variety of acrylic acid distillation/purification devices. If medium-pressure steam is utilized as heat medium in a heater or a heat exchanger which are attached to the acrylic acid production tower 47, polymerized substance may be generated. In view of this, it is desirable to feed low-pressure steam (not lower than 0.2 MPaG and lower than 0.6 MPaG), and to feed the steam with its temperature being regulated in the desirable range.

It is desirable to attach a drain recovering device 40f to the drying device 52 to recover the drain of steam discharged from the drying device 52 as medium- or low-pressure steam, and to utilize the steam as water to be fed into a boiler. Reuse of the steam obtained by recovering the steam fed to the drying device 52 as drain of steam is advantageous in suppressing the quantity of fuel to be consumed by the boiler, saving water to be fed to the boiler, and also by decreasing the combustion quantity of the fuel in the boiler resulted in suppressing the emission amount of NOx. Further, heating cost is saved because steam is reusable as heat medium by utilizing medium- or low-pressure steam generated in the drain recovering device 40f as heat medium in the acrylic acid production apparatus such as the distillation/purification device 47. To this end, it is desirable to install a pipeline 50J for feeding the steam from the drain recovering device 40f to the distillation/purification device.

It is desirable to cover the pipeline with a heat insulating member so as to keep the temperature of the steam from lowering during conveyance of the steam through the pipeline. Further, although not illustrated, it is preferable to alter the arrangement of the pipeline and to provide a pressure regulating valve or its equivalent so as to regulate the steam feeding amount and steam pressure depending on the site to which the steam is to be fed.

According to the above mentioned present invention, heat recovered in the acrylic acid production process includes steam and chilled coolant, which will be described later.

It is recommendable to utilize all or part of steam obtained by recovering heat of reaction generated at the time of gas-phase catalytic oxidation as heat medium in a heating step of the polyacrylic acid production process, namely, at least one of polymerization step, drying step, and surface cross-linking step in implementing the inventive method.

According to this invention, preferably, the steam is high-pressure steam having a gauge pressure of not lower than 1.0 MPaG. It is preferable to recover the steam used in the polyacrylic acid production process by draining to produce steam having a gauge pressure of lower than 1.0 MPaG and to use the steam as heat medium for producing acrylic acid by distillation.

According to this invention, preferably, chilled coolant may be prepared by recovering latent heat generated by heat exchange of liquid heat medium which is fed to an evaporator, with propylene and/or propane, and fed to the polyacrylic acid production process. Also, it is preferable to use the chilled coolant for cooling polyacrylic acid. Particularly, this invention is suitable to a case where a process for producing water-absorbent resin is employed as an example of the polyacrylic acid production process.

Preferably, in the inventive apparatus, the heat recovering device is attached to the gas-phase catalytic oxidation device, and the pipeline includes at least one pressure regulator to feed the heat medium obtained in the heat recovering device into the drying step.

Hereinafter, the embodiment of this invention will be described in further detail with reference to the example. It should be appreciated that this invention is not limited to the below-described example.

EXAMPLE

Acrylic acid and water-absorbent resin using the acrylic acid were produced according to the following manner. Water (aqueous solution containing ethylene glycol of 30 mass %) whose temperature has been regulated at 12° C. by a temperature regulator with use of liquid heat medium (heater with use of steam) was fed from a liquid heat medium feeding reservoir at a fluid rate of 26 m³/h into an evaporator to evaporate propylene. As a result of evaporation of the liquefied propylene, chilled water of 2.4° C. was obtained. The total quantity of the chilled water was recycled into the liquid heat medium feeding reservoir. The chilled water in the liquid heat medium feeding reservoir was fed into the condenser and the cooler which are attached to the distillation column of the acrylic acid production apparatus at a fluid rate of 38 m³/h. Likewise, the chilled water was fed to the respective devices in the water-absorbent resin production apparatus for neutralization, polymerization, and drying at a fluid rate of 38 m³/h. After running these devices in a stable manner, the chilled water after the former use was 13° C., and the chilled water after the latter use was 15° C. The temperature of the chilled water in the liquid heat medium feeding reservoir was 11° C. It was necessary to feed steam of 0.2 MPaG at a fluid rate of 50 kg/h to raise the temperature of the chilled water in the reservoir to 12° C.

Next, the evaporated propylene was contacted with air to perform gas-phase catalytic oxidation. In the first-stage catalyst layer, gas primarily containing acrolein was obtained at the reaction temperature of 320° C., and gas primarily containing acrylic acid was obtained at the reaction temperature of 270° C. in the second-stage catalyst layer. In obtaining acrolein-containing gas, steam of 4.0

MPaG was flowed at 7.5 metric T/h (hereinafter, simply called as "T/h") through the first-stage catalyst layer by a first-stage heat removing boiler to remove heat of reaction. Likewise, in obtaining acrylic-acid-containing gas, steam of 2.0 MPaG was flowed at a fluid rate of 7.0 T/h through the second-stage catalyst layer by a second-stage heat removing boiler to remove heat of reaction.

The reaction gas generated in the reactor was cooled by flowing steam of 0.6 MPaG at 0.8 T/h from a waste heat boiler. Acrylic acid was absorbed in an absorption column with use of water. Thus, an acrylic acid aqueous solution was obtained. Part of the gas distilled off through the top of the absorption column was recycled into the reactor, and the remaining part of the gas was processed in a combustion device in which the waste gas was burned with use of a catalyst. Heat of combustion generated at the time of burning the waste gas was recovered by a waste heat boiler as steam of 0.6 MPaG flowing at a fluid rate of 2.2 T/h.

The thus generated steam was used as follows. Specifically, pipelines are connected with each other by respective pressure regulating valves in such a manner that the steam pressure decreases from 4.0 MPaG to 2.0 MPaG, from 2.0 MPaG to 0.6 MPaG, and from 0.6 MPaG to 0.2 MPaG in this order sequentially. If excessive quantity of steam is fed due to exceedingly high steam pressure, the steam tends to flow to a site where the steam pressure is low. In case that the quantity of steam is excessive even if flowing through the pipeline regulated at 0.2 MPaG, such excessive steam is discharged out of the reaction system by control of the pressure regulating valve.

Thus, purified acrylic acid for water-absorbent resin was obtained by distilling the acrylic acid aqueous solution. At this time, steam of 0.6 MPaG at 9.0 T/h required by the reboiler and heater was obtained from the steams of 4.0 MPaG, 2.0 MPaG, and 0.6 MPaG. Likewise, steam of 0.2 MPaG at 2.3 T/h required in the reboiler and heater was obtained from the steams of 2.0 MPaG, 0.6 MPaG, and 0.2 MPaG.

When water-absorbent resin was produced from the purified acrylic acid by way of neutralization, polymerization, drying, etc., 7.4 T/h of the steam of 4.0 MPaG obtained in the first-stage heat removing boiler was consumed in primarily raising the temperature of the air used in the drying which was implemented after the neutralization and polymerization. Steam of 0.2 MPaG at a fluid rate of 1.5 T/h was generated and recovered as condensed steam in a flash column, and was used for purifying acrylic acid. Accordingly, when observing the heat exchange of chilled water, steam of 270 kg/h is necessary to raise the temperature of the chilled water of 38 $m^3$/h from 11° C. to 15° C. if it is assumed that the water-absorbent resin production process is not carried out. This means power for driving a cooling device necessary for production of water-absorbent resin can be saved by the quantity of heat substantially corresponding to the steam.

As regards the steam, since the steam generated in the acrylic acid production apparatus was used in producing the water-absorbent resin, only the small quantity of steam at a fluid rate of 0.25 T/h was discharged by controlling the pressure regulating valve for flowing the steam at 0.2 MPaG. In case that the water-absorbent resin production apparatus was not operated, steam at a fluid rate of 5.9 T/h was discharged out of the reaction system.

Since steams of different pressure levels are generated in the acrylic acid production apparatus, the steams are usable in the water-absorbent resin production apparatus as well as in the acrylic acid production apparatus, thereby suppressing loss of steam, which has been unavoidable in the prior art. Further, if the latent heat is only used in the acrylic acid production process, the temperature of the chilled water circulated in the acrylic acid process becomes too low which needs to be raised before reused in the acrylic acid production apparatus, which has been unavoidable in the prior art. According to the present invention, latent heat is utilized polyacrylic acid production process such as water-absorbent resin production process. Thus the temperature of the chilled water is appropriately cooled which needs be raised as in the prior art and the power necessary for driving a refrigerator is saved.

This application is based on Japanese patent application serial No. 2002-78678 filed on Mar. 20, 2002 whose priority is claimed under Paris convention, thus the contents thereof is incorporated by reference.

What is claimed is:

1. A method for producing polyacrylic acid comprising an acrylic acid production process and a polyacrylic acid production process, the acrylic acid production process comprising catalytically oxidizing propylene and/or propane in a gaseous phase to generate a reaction product, absorbing the reaction product in a solvent, and optionally separating acrylic acid from an acrylic acid aqueous solution containing the solvent by purification, the polyacrylic acid production process comprising subjecting the acrylic acid or the acrylic acid aqueous solution to polymerization, wherein heat of reaction generated at the gas-phase catalytic oxidation in the acrylic acid production process is recovered by transfer to a heat medium which is then fed to the polvacrylic acid production process, and wherein heat recovered from the heat medium is used in a heating step in the polyacrylic acid production process.

2. The method according to claim 1, wherein chilled coolant is prepared in said acrylic acid production process by recovering latent heat generated by heat exchange of liquid heat medium which is fed to an evaporator, with propylene and/or propane, and the chilled coolant is fed to the polyacrylic acid production process.

3. The method according to claim 1, wherein the polyacrylic acid is a water-soluble polyacrylic acid, a water-absorbent polyacrylic acid, or a salt thereof.

4. The method according to claim 3, wherein the water-absorbent polyacrylic acid or the salt thereof is a water-swelling, water-insoluble polyacrylic acid with cross-linking structure.

5. The method according to claim 3, wherein the water-absorbent polyacrylic acid or the salt thereof is a material capable of absorbing deionized water or saline at least three times as large as its weight.

6. The method according to claim 1, wherein all or part of steam obtained by recovering the heat of reaction generated at the gas-phase catalytic oxidation is fed to the polyacrylic acid production process.

7. The method according to claim 6, wherein the steam is high-pressure steam having a gauge pressure of not lower than 1.0 MPa.

8. The method according to claim 6, wherein steam having a gauge pressure of lower than 1.0 MPa is generated by recovering the steam fed to the polyacrylic acid production process through draining, the steam being used as heat medium for producing acrylic acid.

* * * * *